INVENTOR.
Hermann Seegelken

United States Patent Office 2,762,347
Patented Sept. 11, 1956

2,762,347
FUEL INJECTION FOR DIESEL ENGINES

Hermann Seegelken, Nurnberg, Germany, assignor to Maschinenfabrik Augsburg-Nurnberg, A. G., Nurnberg, Germany Application March 15, 1954, Serial No. 416,372

Claims priority, application Germany March 24, 1953

7 Claims. (Cl. 123—32)

This invention relates to injection of fuel and air into the combustion chamber of a diesel engine. In particular, the invention is directed to an improved method of injecting the fuel and air into the combustion chamber so that an improved fuel air mixture is obtained.

In the co-pending application of Meurer et al., Serial No. 480,432, filed 7 January 1952, for "Operation of Internal Combustion Engines," which is a continuation-in-part of the earlier application for "Injection System for Internal Combustion Engines," Serial No. 325,316, filed December 11, 1953, now abandoned, a disclosure is made of injecting fuel against the wall of a combustion chamber located in the piston head, and then wiping away and vaporizing this film layer with the intake air. It is also disclosed that an improved injection of the fuel into the combustion chamber can be obtained if the axis of the combustion chamber is displaced with respect to the axis of the piston.

The objects of the instant invention are to improve upon the manner of injecting the fuel and air into the combustion chamber, and to modify the combustion chamber so that a more effective vaporizing of the film by the intake air is achieved.

In general these objects are achieved by constructing the combustion chamber in the piston head with a surface formed by the revolution of a curved line, said chamber having its axis displaced from the piston axis as disclosed in said co-pending application. The upper edge of the chamber is cut away to form an air passageway which extends through the top edge into and along and then merges with the wall of the combustion chamber in a stream-lined manner. The fuel is projected in one or more jets onto the wall of this pasageway either directly before or after the point where the passageway merges with the wall of the combustion chamber. By so doing the greater portion of the intake air is held to a relatively closed path which is concentrated upon, and wipes over the liquid film deposited on the wall of the passageway of the combustion chamber. The direction of the intake air is as tangential to the combustion chamber wall as possible.

Thus, the amount of intake air entering the passageway is therefore greater than would enter the combustion chamber with the passageway omitted. The amount of air passing over the film of fuel is therefore increased so that the film is rapidly vaporized. In addition to this intake passageway, a second pocket-like chamber may be formed in the wall of the combustion chamber beyond the portion of the wall adapted to be coated with the film of fuel. This second pocket-like chamber serves to further increase the amount of air flowing through the intake passageway and also to assist in discharging the gas stream from the combustion chamber after the gases have been ignited during the compression stroke.

The means by which the objects of the invention are obtained are described more fully with respect to the accompanying drawings, in which.

Figure 1:
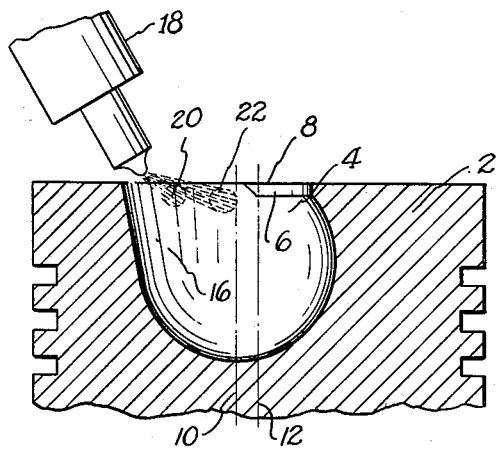
Figure 1 is a cross-sectional view through a piston constructed according to the invention, and indicating the piston of the fuel nozzle and jets of fuel.

In Figure 1 the piston 2 has a combustion chamber 4 formed in the head of the piston, this chamber having a wall shaped by a curved line of revolution. The upper end of the chamber 4 connects with the surface of the piston through a cylindrical wall 6 having an upper edge 8. The axis 10 of chamber 4 is offset from the axis 12 of piston 2.

The upper edge 8 of the combustion chamber is interrupted by a relatively deep notch 14 which continues into a passageway 16, said passageway extending through the cylindrical wall 6 and being continued into a pocket-like chamber formed in the wall of the combustion chamber 4, and which passageway decreases in depth and gradually merges into the contour of said wall in the direction of air rotation. For example, passageway 16 extends over about 90° of the circumference of said chamber, and has its upper and lower portions edgelessly merged with the wall of said chamber. The area and extent of the passageway varies in accordance with the particular piston design, but its function remains the same regardless.

Fuel from injection nozzle 18 is directed in the form of one or more jets 20 and 22 into the fuel chamber, these jets being preferably tangentially impacted on the wall of the chamber or said pasageway adjacent the point where the passageway 16 merges with the wall of the combustion chamber 4. That is to say a film of fuel is formed in the passageway immediately prior to its mergence with the wall of chamber 4 or immediately thereafter, or both. Intake air is given a circular motion as described in said co-pending application and this rotary motion is concentrated into a stream entering the combustion chamber through notch 14 in the direction of arrow 26 and tangentially directed over the fuel film deposited on the wall of the chamber. This air is swirled about in the chamber during the compression stroke and after ignition is discharged from the chamber in the direction of the arrow 28 whereby the air passes over the fuel film one or more times. The fuel film is therefore thoroughly vaporized and mixed with the air to form the combustion gas.

Figure 3:
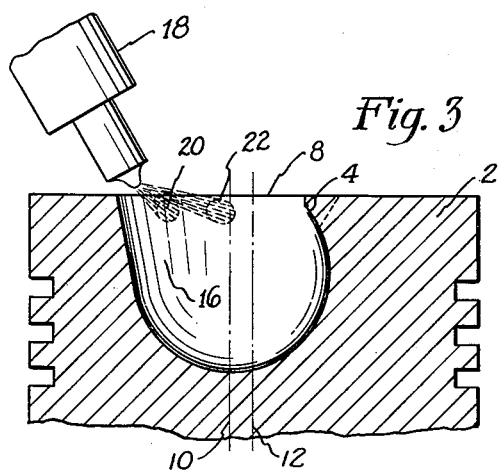
Figure 3 is a cross-sectional view of a modified form of piston.
Figure 4:
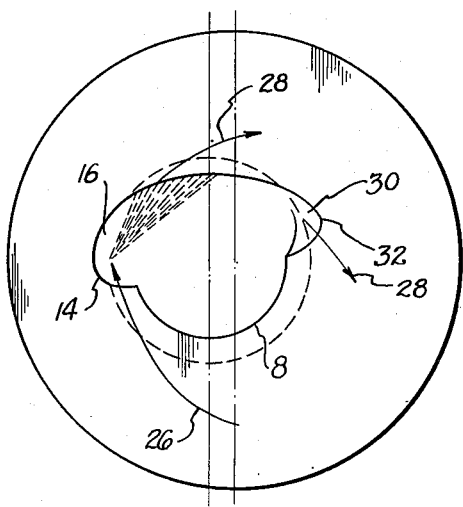
Figure 4 is a top plan view of this modified form.
Figure 2A:
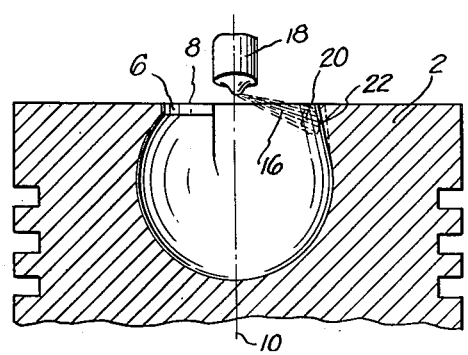
Figure 2a is a cross-sectional view on the line 2a—2a of Figure 2.

As shown in Figures 3 and 4, another pocket-like chamber 30 can be provided immediately behind notch 14 and pocket 16 in the direction of air rotation, this pocket being stream-lined in the same direction from the wall of the chamber to the outlet notch 32 in upper edge 8. The combustion products after ignition are discharged through notch 32, but before ignition the air passes over the fuel film one or more times to thoroughly vaporize the same, and during the discharging period the gases pass over the areas on which the fuel was deposited to vaporize and wipe away any remaining traces of the fuel.

Figure 2:
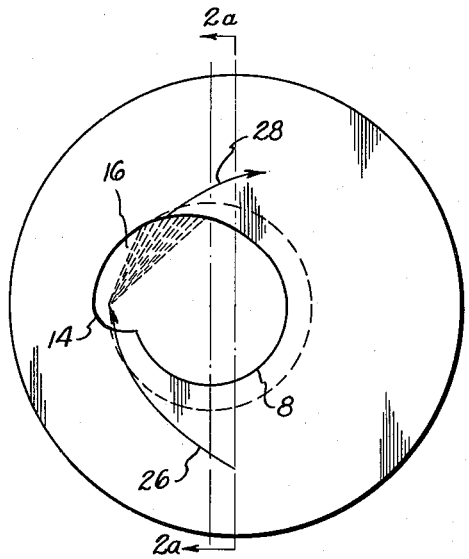
Figure 2 is a top plan view of the piston shown in Figure 1, the injection nozzle being omitted.

The use of the pocket 30 increases the velocity of the air and the gases during the discharging period near the wall of pocket 30, over the structures shown in Figures 1 and 2, and therefore increases the rapidity of the vaporization of the fuel on the fuel impact spots.

As described in said co-pending application, the area of the fuel film on the wall of the combustion chamber is relatively small compared with the total wall surface of the chamber. Ordinarily only a small portion of the intake air would come in contact with the fuel film immediately after it enters the chamber, while the greater portion of the air would not reach the film layer, or mix with the vaporized fuel until a relatively long time after the completion of the intake phase. In said co-pending application it has been described how this can be improved upon by directing the intake air into a closed path which passes through the fuel injection stream and brushes over the fuel deposited on the compression chamber wall, and that this closed path can be achieved by providing a channel or duct in the piston head which terminates tangentially with respect to the wall of the combustion chamber. The combustion products are exhausted in a similar manner. The present invention further improves upon the vaporization of the fuel by concentrating substantially all of the intake air on the deposited fuel film, this concentration being obtained by the passageways formed in the wall of the combustion chambers. In this way a larger portion of the air rotating about the cylinder axis and the air displaced from the cylinder space during the compression stroke flows from the sharp depression formed by the notch in edge 8 through the enlargement into the combustion chamber. Consequently, the amount of air entering the combustion chamber at this enlargement is increased, and therefore the velocity of the air over the fuel film is increased to further the rapid vaporization of the fuel.

It is clear that the invention is not limited to the basic shape of the combustion chamber shown in the drawings, but may be applied to the various forms of combustion chamber shown in said aforementioned co-pending application.

Having now described the means by which the objects of the invention are obtained, I claim:

1. In an internal combustion engine having a cylinder, a piston in said cylinder, a combustion chamber in the head of said piston having a shape formed by the revolution of a curved line, means for injecting fuel upon the wall of said chamber in the form of thin film, and further means to impart to the intake air a rotary motion about the cylinder axis in the direction of the fuel jets thereby vaporizing wall-deposited fuel with the air entering and circulating in the combustion chamber, air directing means comprising a notch which continues into a passageway both formed in the wall of the combustion chamber and gradually increasing radially with respect to the cylinder axis from near the bottom of the combustion chamber up to the opening of said chamber, said notch forming an abrupt enlargement of the opening into said chamber and said passageway extending from said notch in the direction of the rotating air and then gradually diminishing in lateral extension until it merges with the wall of said combustion chamber, whereby the greater part of the air rotating in the cylinder is displaced during the piston compression stroke and flows through said notch into said passageway, and said fuel injection means further comprising means for injecting fuel in said chamber in the direction of the flow of air therein and as a film of fuel deposited on said chamber wall adjacent the merger of said passageway with the contour of said chamber wall and in the path of the air flowing through said passageway.

2. In an internal combustion engine having a cylinder, a piston in said cylinder, a combustion chamber in the head of said piston having a shape formed by the revolution of a curved line, means for injecting fuel upon the wall of said chamber in the form of thin film, and further means to impart to the intake air a rotary motion about the cylinder axis in the direction of the fuel jets thereby vaporizing wall-deposited fuel with the air entering and circulating in the combustion chamber, air directing means comprising a notch which continues into a passageway both formed in the wall of the combustion chamber and gradually increasing radially with respect to the cylinder axis from near the bottom of the combustion chamber up to the opening of said chamber, said notch forming an abrupt enlargement of the opening into said chamber and said passageway extending from said notch in the direction of the rotating air and then gradually diminishing in lateral extension until it merges with the wall of said combustion chamber, whereby the greater part of the air rotating in the cylinder is displaced during the piston compression stroke, and flows through said notch into said passageway, and said fuel injection means further comprising means for injecting the fuel onto the wall of said passageway in the direction of the flow of air therein and as a film of fuel deposited on said wall before the point where said passageway merges into the wall of the combustion chamber.

3. In an internal combustion engine having a cylinder, a piston in said cylinder, a combustion chamber in the head of said piston having a shape formed by the revolution of a curved line, means for injecting fuel upon the wall of said chamber in the form of thin film, and further means to impart to the intake air a rotary motion about the cylinder axis in the direction of the fuel jets thereby vaporizing wall-deposited fuel with the air entering and circulating in the combustion chamber, air directing means comprising a notch which continues into a passageway both formed in the wall of the combustion chamber and gradually increasing radially with respect to the cylinder axis from near the bottom of the combustion chamber up to the opening of said chamber, said notch forming an abrupt enlargement of the opening into said chamber and said passageway extending from said notch in the direction of the rotating air and then gradually diminishing in lateral extension until it merges with the wall of said combustion chamber, whereby the greater part of the air rotating in the cylinder is displaced during the piston compression stroke and flows through said notch into said passageway and said fuel injection means further comprising means for injecting the fuel onto the wall of said chamber in the direction of the flow of air therein and as a film of fuel deposited on said wall immediately after the point where said passageway merges into the wall of the combustion chamber.

4. In an internal combustion engine as in claim 1, said piston further comprising a second passageway communicating with a second notch in the chamber opening on a subsequent part of the combustion chamber in the direction of the flow of air and following the deposited film of fuel and forming an exhaust path for ignited gases.

5. In an internal combustion engine as in claim 4, said second passageway beginning in the direction of the flow of air immediately adjacent the merger of the first mentioned passageway and said wall and being streamlined to said second notch to form a substantially mirror image of the first named passageway and notch.

6. In an internal combustion chamber as in claim 5, the vertical axis of said chamber being offset with respect to the vertical axis of said piston, and said second notch being on the side of the piston the more close to said piston axis.

7. In an internal combustion engine as in claim 1, the vertical axis of said chamber being offset from the vertical axis of said piston, and said notch being on the side of said piston the more distant from said piston axis.

References Cited in the file of this patent

UNITED STATES PATENTS

| | | |
|---|---|---|
| 1,943,495 | Thomas | Jan. 16, 1934 |
| 2,514,730 | Sonderegger | July 11, 1950 |
| 2,620,781 | Petersen | Dec. 9, 1952 |

FOREIGN PATENTS

| | | |
|---|---|---|
| 907,677 | France | Mar. 19, 1946 |
| 952,636 | France | Nov. 21, 1949 |
| 643,619 | Great Britain | Sept. 20, 1950 |

OTHER REFERENCES

Serial No. 251,007, Wiebicke (A. P. C.), published May 11, 1943.